United States Patent
Wan et al.

(10) Patent No.: US 9,961,046 B2
(45) Date of Patent: May 1, 2018

(54) NAT PORT MANAGER FOR ENABLING PORT MAPPING USING REMAINDERS

(71) Applicant: Juniper Networks, Inc., Sunnyvale, CA (US)

(72) Inventors: Wei Wan, Beijing (CN); LiHong Hao, Beijing (CN); Juntao Gao, Beijing (CN); Qiong Wang, Beijing (CN); Jun Deng, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 252 days.

(21) Appl. No.: 14/871,408

(22) Filed: Sep. 30, 2015

(65) Prior Publication Data
US 2017/0078245 A1   Mar. 16, 2017

(30) Foreign Application Priority Data
Sep. 15, 2015   (CN) .......................... 2015 1 0587816

(51) Int. Cl.
   *H04L 29/12*   (2006.01)
(52) U.S. Cl.
   CPC ........ *H04L 61/255* (2013.01); *H04L 61/2514* (2013.01); *H04L 61/2517* (2013.01)
(58) Field of Classification Search
   CPC ..... H04L 61/256; H04L 61/255; H04L 61/20; H04L 61/2514; H04L 61/2517
   See application file for complete search history.

(56) References Cited

U.S. PATENT DOCUMENTS

| | | | |
|---|---|---|---|
| 6,560,610 | B1 | 5/2003 | Eatherton et al. |
| 7,227,842 | B1 | 6/2007 | Ji et al. |
| 2002/0034187 | A1 | 3/2002 | Kalkunte et al. |
| 2007/0016637 | A1* | 1/2007 | Brawn ................ H04L 47/2441 709/200 |
| 2012/0275460 | A1* | 11/2012 | Klotsche ............... H04L 49/552 370/392 |
| 2016/0072766 | A1* | 3/2016 | Jain ..................... H04L 61/2567 709/228 |

FOREIGN PATENT DOCUMENTS

CN   101262425 A   9/2008

OTHER PUBLICATIONS

Intel, "Improving Network Performance in Multi-Core Systems", 2017, Intel Corp, 4 pages.*

(Continued)

*Primary Examiner* — Arvin Eskandarnia
*Assistant Examiner* — Amy Ling
(74) *Attorney, Agent, or Firm* — Harrity & Harrity, LLP

(57) ABSTRACT

A network device may include one or more processors. The one or more processors may receive a call from a services processor to allocate network address translation resources for a data packet. The one or more processors may determine an identifier associated with the services processor. The one or more processors may allocate network address translation resources using a network address port translation manager based on the identifier. The network address translation port manager may be a two-level port bitmap management system that determines a translated source port for the data packet.

20 Claims, 9 Drawing Sheets

(56) References Cited

OTHER PUBLICATIONS

Juniper Networks, Inc., "Security Configuration Guide for J-series Services Routers and SRX-series Services Gateways, Release 9.3," http://www.pdfdrive.net/security-configuration-guide-for-j-series-services-routers-and-srx-e3171153.html, Dec. 2008, 798 pages.
Juniper Networks, Inc., "SRX5000 Line Devices Processing Overview," http://www.juniper.net/techpubs/en_US/junos12.3x48/topics/concept/forwarding-processing-srx5000-line-overview.html, Feb. 26, 2015, 10 pages.
Juniper Networks, Inc., "SRX5600 and SRX5800 Services Gateways Processing Overview," http://www.jnpr.net/techpubs/en_US/junos12.1x46/topics/concept/forwarding-processing-srx5000-line-overview.html, Nov. 4, 2011, 10 pages.
Juniper Networks, Inc., "Understanding Load Distribution in SRX Series Devices," http://www.juniper.net/documentation/en_US/junos12.1x47/topics/concept/security-load-distribution-understanding .html, Feb. 18, 2015, 2 pages.
Juniper Networks, "Network Address Translation Feature Guide for Security Devices," https://www.juniper.net/documentation/en_US/junos12.3x48/information-products/pathway-pages/security/security-nat.pdf, Mar. 13, 2015, 322 pages.

\* cited by examiner

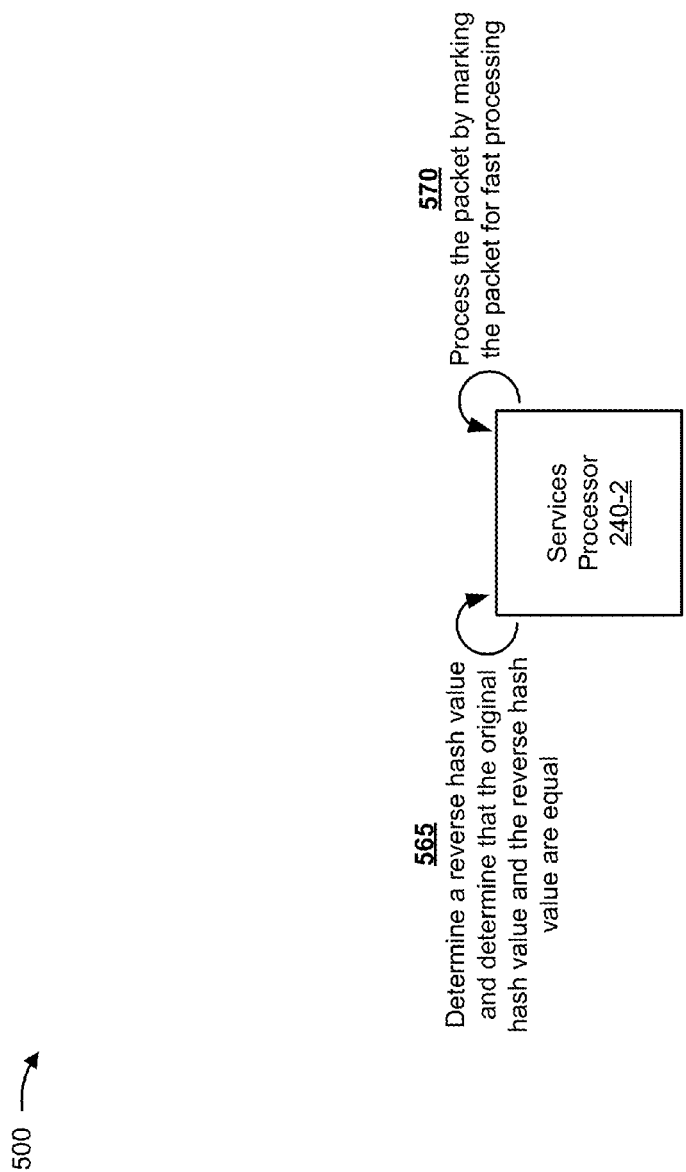

NAT PORT MANAGER FOR ENABLING PORT MAPPING USING REMAINDERS

RELATED APPLICATION

This application claims priority under 35 U.S.C. § 119 to Chinese Patent Application No. 201510587816.3, filed on Sep. 15, 2015, the content of which is incorporated by reference herein in its entirety.

BACKGROUND

In computer networking, a network address translation (NAT) is a networking service that allows devices on a private network to communicate with devices on a public network, such as the Internet. Using a NAT allows one or more devices, on a private network, to be viewed, by devices outside the NAT, as having the same Internet connection or the same network address, thereby providing security to the one or more devices on the private network. Port forwarding or port mapping is an application of NAT that redirects a communication request from one Internet protocol (IP) address and port number combination to another while packets (e.g., segments of data) traverse a network device (e.g., a services gateway).

SUMMARY

According to some possible implementations, a network device may include one or more processors. The one or more processors may receive a call from a services processor to allocate network address translation resources for a data packet. The one or more processors may determine an identifier associated with the services processor. The one or more processors may allocate network address translation resources using a network address port translation manager based on the identifier. The network address translation port manager may be a two-level port bitmap management system that determines a translated source port for the data packet.

Additionally or alternatively, the two-level port bitmap management system may include a cache bitmap layer as a first level of the two-level port bitmap management system and may include a port bitmap layer as a second level of the two-level port bitmap management system.

Additionally or alternatively, a cache bit, included in the cache bitmap layer, may be associated with a set of port bits.

Additionally or alternatively, each port bit of the set of port bits may be associated with a logical port of the network device.

Additionally or alternatively, when allocating the network address translation resources, the one or more processors may allocate a translated source address, a translated destination address, a translated destination port, and a protocol. The one or more processors may determine a translated source port remainder based on the identifier. The one or more processors may determine a translated source port, based on the translated source port remainder, using the two-level port bitmap management system.

Additionally or alternatively, when determining the translated source port remainder, the one or more processors may perform a short XOR operation on a tuple. The tuple may include the translated source address, the translated destination address, the translated destination port, and the protocol. The one or more processors may perform a modulo operation, using the tuple as a dividend for the modulo operation and a total quantity of services processors, located within the network device, as a divisor for the modulo operation to obtain a result. The one or more processors may multiply the result by the identifier to determine the translated source port remainder.

Additionally or alternatively, when determining the translated source port, the one or more processors may select a cache bit range associated with the translated source port remainder. The one or more processors may select a cache bit, associated with the cache bit range, having one or more unused port bits. The one or more processors may determine a port bit range associated with the cache bit. The one or more processors may select an unused port bit included in the port bit range. The one or more processors may determine an identifier for an unused logical port, associated with the unused port bit, using the port bit range. The identifier for the unused logical port may correspond to the translated source port.

According to some possible implementations, a computer-readable medium may store one or more instructions that, when executed by one or more processors, may cause the one or more processors to receive a call from a services processor to allocate network address translation resources for a data packet. The one or more instructions, when executed by one or more processors, may cause the one or more processors to determine an identifier associated with the services processor. The one or more instructions, when executed by one or more processors, may cause the one or more processors to allocate network address translation resources, using a network address translation port manager, based on the identifier. The network address translation port manager may be a two-layer port bitmap management system. The one or more instructions, when executed by one or more processors, may cause the one or more processors to provide the network address translation resources to the services processor.

Additionally or alternatively, the one or more instructions, that cause the one or more processors to allocate the network address translation resources, may cause the one or more processors to allocate a translated source address, a translated destination address, a translated destination port, and a protocol. The one or more instructions, when executed by the one or more processors, may cause the one or more processors to determine a translated source port remainder based on the identifier. The one or more instructions, when executed by the one or more processors, may cause the one or more processors to determine a translated source port based on the translated source port remainder using a two-level port bitmap management system.

Additionally or alternatively, the one or more instructions, that cause the one or more processors to determine the translated source port, may cause the one or more processors to select a cache bit range associated with the translated source port remainder. The one or more instructions, when executed by the one or more processors, may cause the one or more processors to select a cache bit, associated with the cache bit range, having one or more unused port bits. The one or more instructions, when executed by the one or more processors, may cause the one or more processors to determine a port bit range associated with the cache bit. The one or more instructions, when executed by the one or more processors, may cause the one or more processors to select an unused port bit included in the port bit range. The one or more instructions, when executed by the one or more processors, may cause the one or more processors to determine an identifier for an unused logical port, associated with the unused port bit, using the port bit range. The identifier may correspond to the translated source port for the unused logical port.

Additionally or alternatively, the one or more instructions, that cause the one or more processors to select the cache bit, may cause the one or more processors to select the cache bit that is set to a value that indicates that the cache bit has one or more unused port bits.

Additionally or alternatively, the one or more instructions, that cause the one or more processors to determine the port bit range associated with the cache bit, may cause the one or more processors to determine the port bit range for the cache bit, where the port bit range equals [n*a, (n+1)*a−1]. 'n' may be the cache bit for which the associated port bit range is being determined. 'a' may be a quantity of port bits associated with the cache bit.

Additionally or alternatively, the one or more instructions, that cause the one or more processors to select the unused port bit included in the port bit range, may cause the one or more processors to select the unused port bit that has a value set to indicate that the cache bit has one or more unused port bits.

According to some possible implementations, a method may include receiving, by one or more processors, a call from a services processor to allocate network address translation resources for a data packet. The data packet may be associated with packet information. The packet information may be used to determine a first hash value. The method may include determining, by the one or more processors, an identifier associated with the services processor. The method may include allocating, by the one or more processors, network address translation resources, using a two-layer port bitmap management system, based on the identifier. The network address translation resources may be associated with a second hash value, where the first hash value equals the second hash value. The method may include providing, by the one or more processors, network address translation resources to the services processor.

Additionally or alternatively, the method may include allocating a translated source address, a translated destination address, a translated destination port, and a protocol. The method may include determining a translated source port remainder based on the identifier. The method may include determining a translated source port based on the translated source port remainder using the two-layer port bitmap management system.

Additionally or alternatively, the method may include selecting a cache bit range associated with the translated source port remainder. The method may include selecting a cache bit, associated with the cache bit range, having an unused port bit. The method may include determining a port bit range associated with the cache bit. The method may include selecting an unused port bit included in the port bit range. The method may include determining an identifier for an unused logical port, associated with the unused port bit, using the port bit range. The identifier for the unused logical port may correspond to the translated source port.

Additionally or alternatively, the method may include setting an identifier associated with the cache bit equal to a value that indicates that all t'1,' based on all logical ports associated with the cache bit are used.

Additionally or alternatively, when determining an identifier for an unused logical port, the method may include determining a logical port range. The method may include determining the identifier for the unused logical port based on the logical port range. Additionally or alternatively, when determining the logical port range, the method may include determining the logical port range, where [n/a quantity of cache bits in a cache bit range+(n % the quantity of cache bits in a cache bit range)*a*a total quantity of services processors located within a network device] equals a first logical port associated with the logical port range and [n/the quantity of cache bits in a cache bit range+((n % the quantity of cache bits in a cache bit range+1)*a−1)*the total quantity of services processors located within the network device] equals a last logical port associated with the logical port range. 'n' may be the cache bit associated with the port bit range. 'a' may be a quantity of port bits associated with each cache bit.

Additionally or alternatively, when determining the logical port range, the method may include determine the identifier for the unused logical port, where the identifier for the unused logical port equals the first logical port in the logical port range+w*(c−1). 'w' may be an incremental change in a value for identifiers for logical ports in the logical port range. 'c' may be an order value for the unused port bit within the logical port range.

According to some possible implementations, a system may include means for receiving a call from a services processor to allocate network address translation resources for a data packet. The system may include means for determining an identifier associated with the services processor. The system may include means for allocating network address translation resources using a network address port translation manager based on the identifier. The network address translation port manager may be a two-level port bitmap management system that determines a translated source port for the data packet.

BRIEF DESCRIPTION OF THE DRAWINGS

FIGS. 5A-5D are diagrams of an example implementation relating to the example process shown in FIG. 3.

DETAILED DESCRIPTION

Figure 1A:
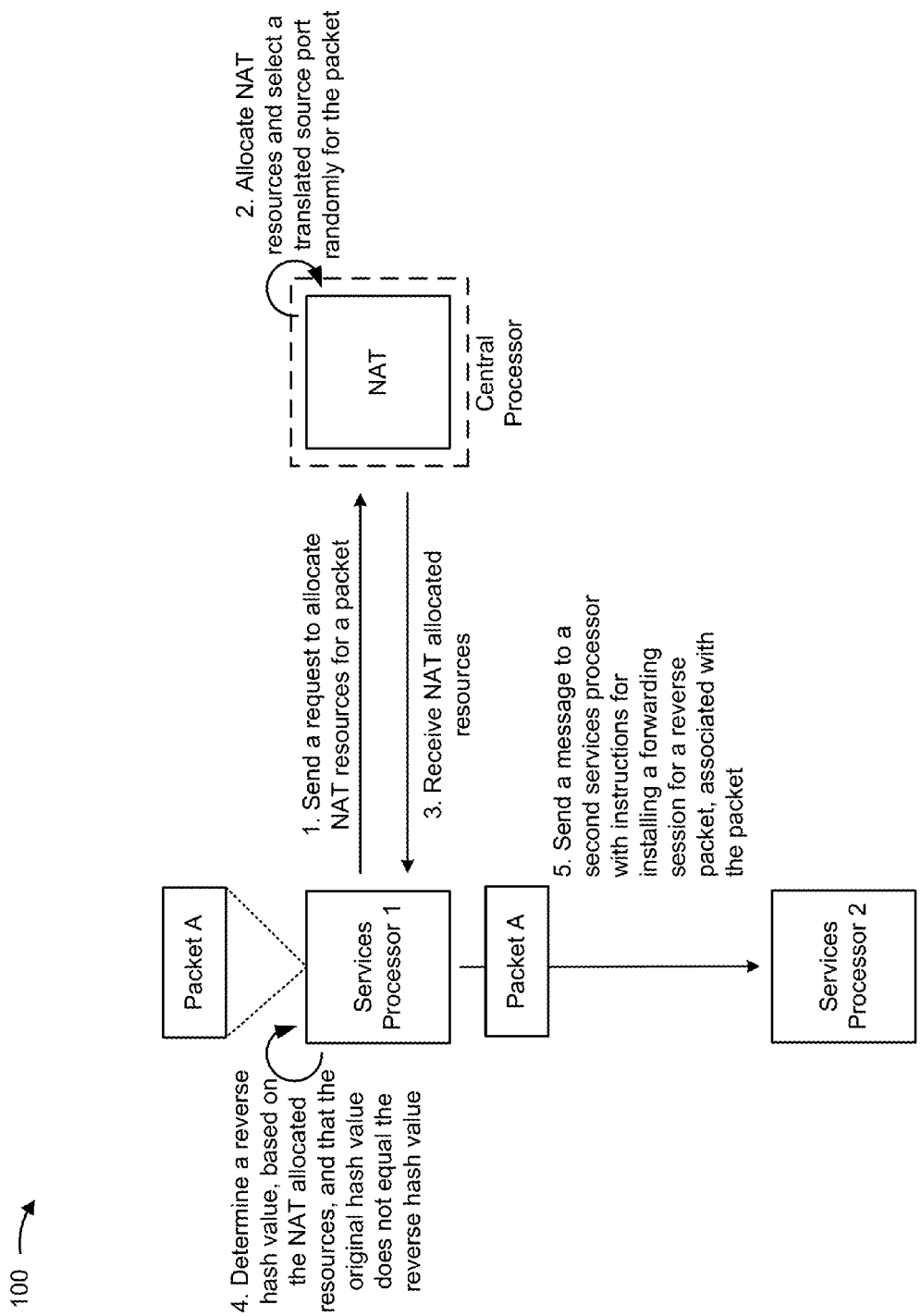
FIGS. 1A-1B are diagrams of an overview of an example implementation described herein.

The following detailed description of example implementations refers to the accompanying drawings. The same reference numbers in different drawings may identify the same or similar elements.

Generally, in packet switching technology, a packet traverses a path from a source point to a destination point, via a network device (e.g., a source point 'a' and a destination point 'b,' via a network device, where a path is a→b and where 'a' and 'b' may be, for example, user devices). A reverse packet is the packet returning from the destination point to the source point (e.g., b→a), via the network device.

When a packet enters a network device (e.g., a services gateway), the packet is processed based on preconfigured policies (e.g., rules). The preconfigured policies may include, for example, determining whether to allow a packet into the network device, which firewall filters to apply to the packet, which route the packet may take to reach the packet's destination, whether to apply NAT, or the like. A network processing unit (NPU), within the network device, may receive the packet and obtain packet information associated with the packet (e.g., a source IP address, a destination IP address, a source port, a destination port, an IP protocol, etc.).

The NPU may provide the packet to a services processor for processing the packet, according to the preconfigured policies. A network device may have multiple services processors. The NPU may select a particular services processor based on the packet information, factoring in load-balancing among the multiple services processors.

A flow is a sequence of packets with common characteristics, such as a same source and destination Internet Protocol (IP) address, transport layer protocol information, and/or type of IP protocol. Packets belonging to a same flow are processed in the same way and provided to the same services processor.

To select the particular services processor, the NPU may apply a hash algorithm to the packet information to determine an original hash value (e.g., an original hash value for a packet traveling from a→b equals Hash Value 1). A hash algorithm is a function that converts an original data string into a numeric output string of a fixed length to determine a hash value. The numeric output string is generally smaller than the original data string. Hash algorithms are designed to be collision-resistant, meaning that there is a very low probability that the same string would be created for different data. The NPU may assign a services processor based on the original hash value.

A network device may require a reverse packet to be processed by the same services processor, as the packet, for system performance reasons (e.g., the same services processor may store preconfigured policies for processing the packet, which may apply to the reverse packet, allowing for less time spent and less device resources to be consumed for processing the reverse packet). This is possible since the hash value for the packet (e.g., the original hash value) and the reverse packet (e.g., a reverse hash value) are equal (e.g., the original hash value=the reverse hash value=Hash Value 1 because values for the source IP address and destination IP address and values for the source port and the destination port, although transposed, are not changed, thereby providing a same result when the hash algorithm is applied).

When a NAT is applied to the packet, however, source information (i.e., the source IP address and the source port) in the packet information changes, based on the NAT obscuring/changing the source information for security reasons (e.g., after applying the NAT, the source point 'a' may be changed to a source point 'c,' where the path is c→b and the reverse path for the reverse packet is b→c). Here, the reverse hash value for the reverse packet will not equal the original hash value, determined before the NAT was applied for purposes of selecting the particular services processor (e.g., an original hash value, where the source point is 'a,' will not equal a reverse hash value for a reverse packet, where the source point is 'c,' since the packet information for the packet and the reverse packet are different, resulting in different hash values when the hash algorithm is applied).

When the NAT is applied, determining the same services processor is difficult, if not impossible. In certain instances, the services processor may send the packet to a second services processor to install a forwarding session for the packet, when the original hash value for the packet and the reverse hash value for the reverse packet are not equal. However, storing a forwarding session for installation and installing a forwarding session consumes memory and network device resources. Additionally, sending the packet to a second services processor reduces speed and efficiency for processing the packet.

A NAT may have a current NAT port manager for allocating and assigning source ports when the NAT is performed. However, the current NAT port manager uses a port bitmap system, where NAT source ports (e.g., source ports translated based on performing NAT or "translated source ports") are allocated randomly or in a round-robin fashion. In this way, the reverse hash value for the reverse packet may not be manipulated to find the same services processor that processed the packet.

Implementations described herein may provide a NAT port manager for selecting a translated source port when allocating NAT resources, based on using a remainder determined from packet information for a packet, where the translated source port enables a packet to be processed without installing a forwarding session and where a reverse packet for the packet may correspond to a same services processor, to process the reverse packet, as the services processor that processed the packet.

Figure 1B:
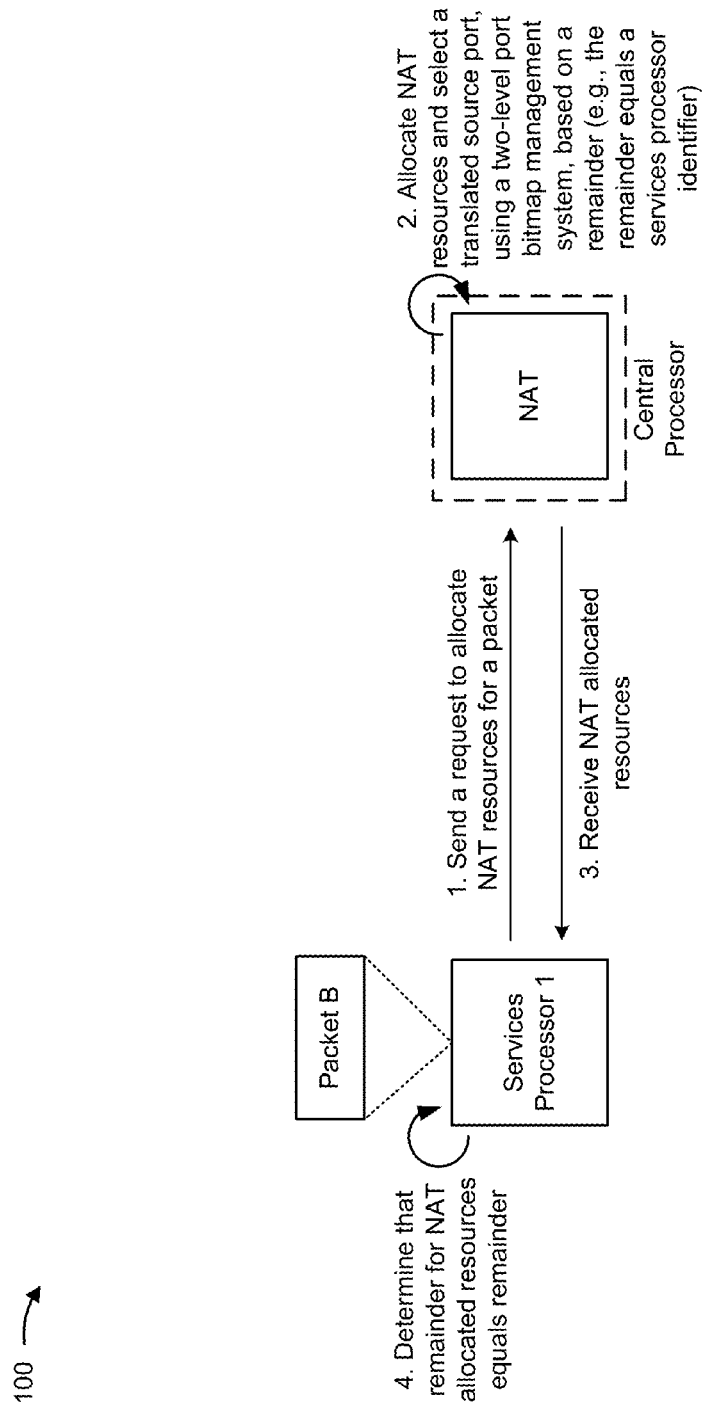

FIGS. 1A and 1B are diagrams of an overview of an example implementation 100 described herein. As shown in FIG. 1A, assume that NAT is performed using a current NAT port manager. Assume that the current NAT port manager is located within a central processor. The central processor is a processor within a network device. Assume that a NPU receives a packet (e.g., Packet A) from a network (e.g., Network) and obtains packet information associated with the packet. Assume that the NPU determines an original hash value, based on packet information associated with the packet, and sends the packet to the central processor, to assign a services processor (e.g., Services Processor 1) for processing the packet, based on the original hash value. Assume that the central processor sends the packet to the services processor for further processing.

As shown in FIG. 1A, and by reference number 1, the services processor may send a request to allocate NAT resources for the packet to the NAT (e.g., perform a NAT).

As shown in FIG. 1A, and by reference number 2, the NAT may allocate the NAT resources and may select a translated source port randomly for the packet. As shown in FIG. 1A, and by reference number 3, the services processor may receive the NAT allocated resources.

As shown in FIG. 1A, and by reference number 4, the services processor may determine a reverse hash value, based on the NAT allocated resources, and determine that the original hash value does not equal the reverse hash value, based on the randomly assigned translated source port. As shown in FIG. 1A, and by reference number 5, the services processor may send a message to a second services processor with instructions for installing a forwarding session for a reverse packet, associated with the packet, when the second services processor receives the reverse packet for processing (e.g., send a message to Services Processor 2 with instructions for installing a forwarding session for the reverse packet, which contains a translated source IP address, a translated source port, a destination IP address, a destination port, and an IP protocol). In this way, when the reverse packet enters the network device, the second services processor may install the forwarding session for the reverse packet, enabling the reverse packet to locate the same services processor, which processed the packet. As shown in FIG. 1B, assume that a NAT is performed using a NAT port manager with a two-level port bitmap management system that enables port mapping using remainders. Assume that the NPU receives a packet (e.g., Packet B) from the network and obtains packet information associated with the packet. Assume that the NPU determines an original hash value, based on packet information associated with the packet, and sends the packet to the central processor, to assign a services processor (e.g., Services Processor 1) for processing the packet, based on the original hash value. Assume that the central processor sends the packet to the services processor for further processing.

As shown in FIG. 1B, and by reference number 1, the services processor may receive the packet from the NPU and may send a request to the NAT to allocate NAT resources for the packet. As shown in FIG. 1B, and by reference number 2, the NAT may allocate the NAT resources and may select a translated source port, using the two-level port bitmap management system that enables port mapping using remainders.

As shown in FIG. 1B, and by reference number 3, the services processor may receive the allocated NAT resources, including the translated source port.

As shown in FIG. 1B, and by reference number 4, the services processor may determine that the original hash value equals the reverse hash value, based on the translated source port. In this way, a reverse packet may locate the same services processor, which processed the packet, based on the NAT port manager's allocation of NAT resources without requiring installing a forwarding session. Using this NAT port manager may conserve memory and processor resources and increase processing speed and efficiency.

Figure 2:
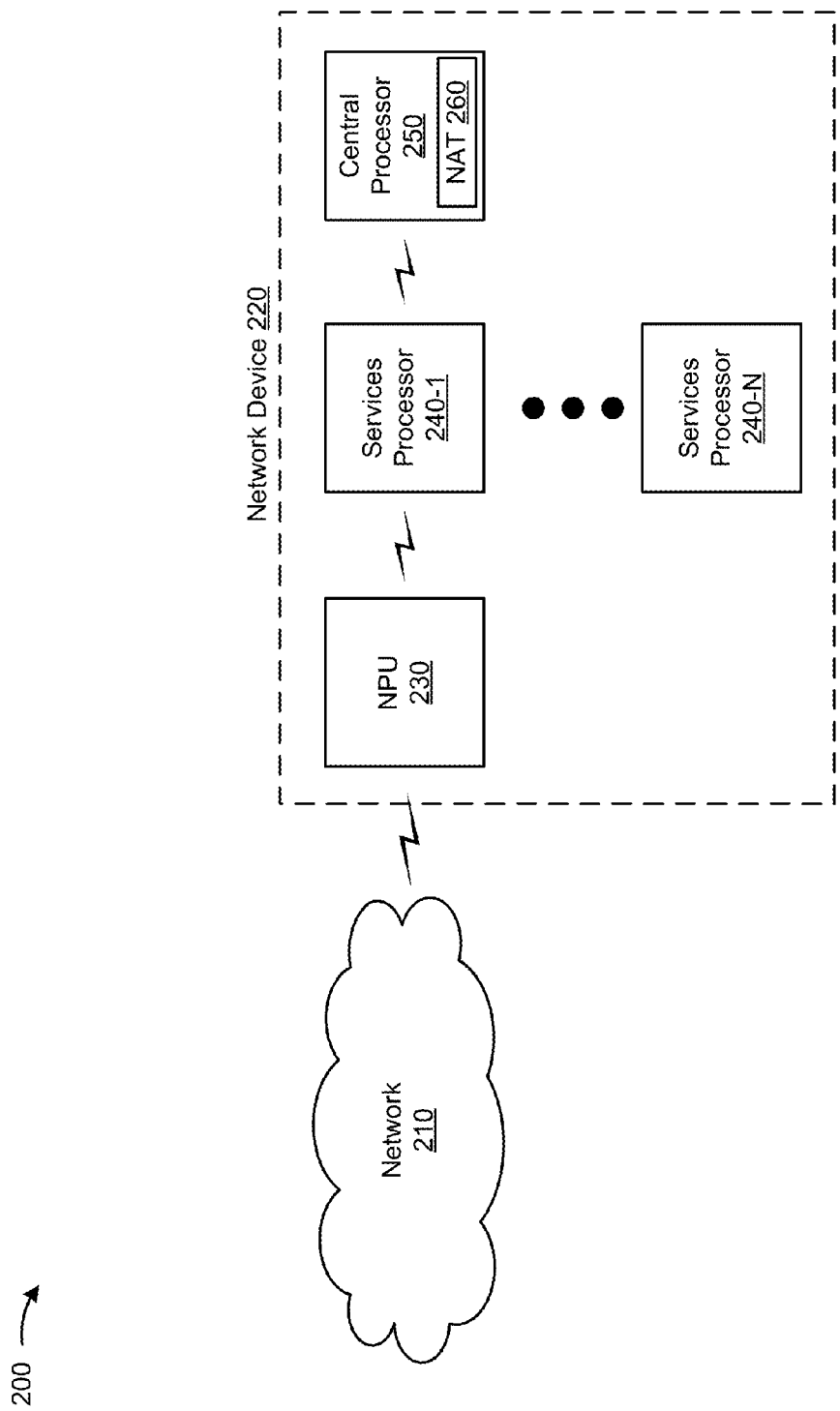
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network 210 and a network device 220, which may include a NPU 230, one or more services processors 240-1 through 240-N (N≥1) (hereinafter referred to collectively as "services processors 240," and individually as "services processor 240"), a central processor 250, and a NAT 260. Devices of environment 200 may interconnect via wired connections, wireless connections, or a combination of wired and wireless connections.

Network 210 may include one or more wired and/or wireless networks. For example, network 210 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Network device 220 may include one or more data processing devices and/or traffic transfer devices. For example, network device 220 may include a gateway, a router, a modem, a switch, a firewall, a network interface card (NIC), a hub, a bridge, a server, an optical add/drop multiplexer (OADM), or any other type of device that processes and/or transfers traffic. Additionally, or alternatively, network device 220 may send and/or receive data packets (e.g., packets) from network 210. As shown in FIG. 2, network device 220 may include NPU 230, services processors 240, central processor 250, and/or NAT 260.

NPU 230 may include one or more processors capable of receiving, processing, storing, and/or transferring traffic associated with network device 220. For example, NPU 230 may receive packets associated with traffic from network 210. NPU 230 may provide the packets to services processor 240 and/or to central processor 250 for further processing.

Services processor 240 may include one or more processors capable of receiving, processing, storing, and/or transferring traffic associated with network 210. For example, services processor 240 may establish and/or manage traffic flows and packets within the traffic flows. Services processor 240 may receive packets from NPU 230 and/or central processor 250. Services processor 240 may call NAT 260, via central processor 250, to perform NAT on the packets. Services processor 240 may receive NAT allocated resources from NAT 260.

Central processor 250 may include one or more processors capable of receiving, processing, storing, and/or transferring traffic associated with network 210. Central processor 250 may arbitrate and/or allocate network device resources and distribute packets so that a same services processors 240 may handle/process the same flow. Central processor 250 may receive packets from NPU 230. Central processor 250 may provide a call from services processor 240 to NAT 260 to allocate NAT resources for the packets.

NAT 260 may include a network security processor that provides NAT functionality and protects devices of a private network associated with network device 220. NAT 260 may include a gateway functionality, a router functionality, a switch functionality, a firewall functionality, or the like. NAT 260 may perform security operations in order to protect network device 220 from attacks originating outside of a private network associated with network device 220. NAT 260 may obtain a call from services processor 240 to allocate NAT resources for a packet for processing by services processor 240. NAT 260 may perform NAT by re-writing a source and/or destination network address included within packets that flow through NAT 260, using a NAT port manager with a two-level port bitmap management system. NAT 260 may provide the NAT allocated resources to services processor 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
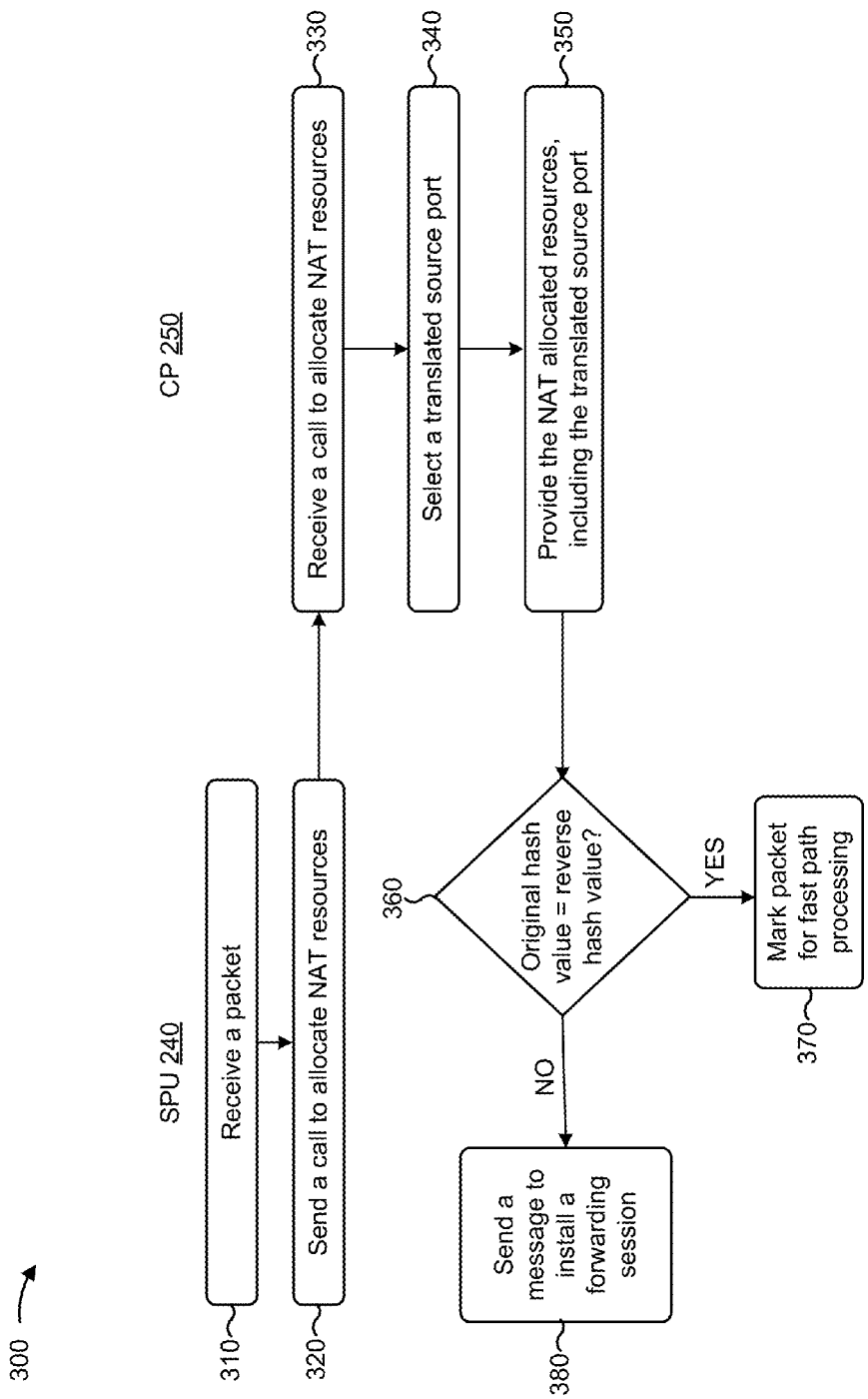
FIG. 3 is a flow chart of an example process for using a NAT port manager with a two-level port bitmap management system that enables port mapping using remainders.

FIG. 3 is a flow chart of an example process 300 for using a NAT port manager with a two-level port bitmap management system that enables port mapping using remainders. In some implementations, one or more process blocks of FIG. 3 may be performed by NAT 260. In some implementations, one or more process blocks of FIG. 3 may be performed by another device or a group of devices separate from or including NAT 260, such as network device 220, NPU 230, services processor (SPU) 240, and/or central processor (CP) 250.

As shown in FIG. 3, process 300 may include receiving a packet (block 310). For example, network device 220 may receive a packet from network 210, via an interface of NPU 230. NPU 230 may receive the packet, perform sanity checks on the packet, and/or may apply various screens (e.g., Disk operating System (DoS) screens) to the packet. Additionally, or alternatively, NPU 230 may analyze the packet to obtain packet information (e.g., a source IP address, a destination IP address, a source port, a destination port, an IP protocol, etc.).

The packet information may be formed into a tuple (e.g., a 4-tuple, a 5-tuple, a 6-tuple, etc.). A tuple is a finite ordered list of elements, where the elements in the list are separated by a comma. Additionally, or alternatively, NPU 230 may determine a tuple for the packet based on the packet information (e.g., determine a 5-tuple, having five elements in the list=<1.1.1.1, 100, 2.2.2.2, 100, 6>, where the source IP address=1.1.1.1, the source port=100, the destination IP address=2.2.2.2, the destination port=100, and the IP protocol=6 for Internet Protocol version 6 (IPv6)).

Additionally, or alternatively, NPU 230 may determine whether a session for processing the packet was previously created by services processor 240 (e.g., a session previously created for handling packets belonging to a same flow), by comparing a hash value associated with the tuple (e.g., an original hash value), determined by performing a hash algorithm on the tuple (e.g., a short_XOR function), to hash values stored in a sessions table associated with NPU 230. If services processor 240 previously created a session for the packet, then the hash value associated with the tuple would match one of the stored hash values in the sessions table associated with NPU 230.

If NPU 230 determines that a session was previously created for processing the packet (e.g., an existing session), NPU 230 may processes the packet based on preconfigured policies (e.g., rules), associated with the existing session and directly send the packet to services processor 240 for further processing (e.g., applies a "fast path" for processing the packet). However, if NPU 230 determines that a session was not previously created for processing the packet (e.g., a first packet of a flow), NPU 230 may provide the packet to central processor 250 before the packet is provided to services processor 240 (e.g., a "slow path").

Central processor 250 may verify that a session does not exist for the packet by comparing the hash value, determined by performing the hash algorithm on the tuple, associated with the tuple for the packet, with stored hash values in a session table associated with central processor 250. If central processor 250 determines that a session was previously created for processing the packet based on the hash value, associated with the tuple, matching a stored hash value in the sessions table associated with central processor 250, central processor 250 may send the packet to services processor 240, previously assigned and associated with a flow for the packet.

If central processor 250 determines that a session was not previously created for processing the packet, based on the hash value for the tuple not matching a stored hash value in the sessions table associated with central processor 250, central processor 250 may create a pending path for the session (e.g., a path from the source IP address and source port to the destination IP address and destination port or a→b) for the packet.

Additionally, or alternatively, central processor 250 may select services processor 240 (e.g., Services Processor 1, Services Processor 2, Services Processor 3, etc.) for creating the session and/or for performing other processing functions (e.g., intelligently analyzing a load on each services processor 240 within network device 220 and selecting a services processor 240 based on, for example, efficiency, load-distribution between service processors 240, or the like, using a load-balancing algorithm, where packets belonging to the same flow are processed by the same services processor 240).

To select the services processor 240, central processor 250 may perform a modulo (MOD) operation (e.g., represented by '%') on the hash value to obtain a remainder, based on a quantity of services processors 240 located within network device 220 (e.g., a quantity of services processors 240 (sp_num)=4, a sp_num=5, a sp_num=6, etc.), where the remainder=(short_XOR(tuple)) % quantity of services processors 240 (e.g., remainder=(short_XOR(1.1.1.1, 100, 2.2.2.2, 100, 6) % 4=2). The hash value may be a dividend in the MOD operation and the quantity of services processors 240 may be the divisor in the MOD operation.

Additionally, or alternatively, central processor 250 may associate an identifier for a services processor 240 with the remainder (e.g., if the remainder=2, then services processor identifier (sp_id)=2 for services processor 240; if the remainder=3, then sp_id=3 for services processor 240; if the remainder=4, then sp_id=4 for services processor 240; etc.).

Additionally, or alternatively, central processor 250 may send the packet to services processor 240, based on the remainder (e.g., if the remainder=2, then central processor 250 may send the packet to services processor 240 with sp_id=2; if the remainder=3, then central processor 250 may send the packet to services processor 240 with sp_id=3; if the remainder=4, then central processor 250 may send the packet to services processor 240 with sp_id=4; etc.).

Additionally, or alternatively, central processor 250 may provide a message, notifying services processor 240 to create a session for the flow locally on services processor 240.

Services processor 240 may receive the packet from central processor 250. Additionally, or alternatively, services processor 240 may verify that a session does not exist for the packet by comparing the hash value, associated with the packet, determined by performing a hashing algorithm, with stored hash values in a session table associated with services processor 240. If services processor 240 determines that a session was previously created for processing the packet (e.g., based on the hash value matching a stored hash value in the sessions table associated with services processor 240), then services processor 240 may process the packet according to the preconfigured policies associated with the flow for the packet.

If services processor 240 determines that a session was not previously created for processing the packet (e.g., based on the hash value not matching a stored hash value on the session table associated with services processor 240), services processor 240 may call NAT 260 to allocate NAT resources for the packet, prior to creating the session. Additionally, or alternatively, services processor 240 may create a queue for processing packets for the flow and/or may add additional packets from the flow to the queue, pending creation of the session.

As further shown in FIG. 3, process 300 may send a call to allocate NAT resources (block 320). For example, services processor 240 may send a call to NAT 260, via central processor 250, to allocate NAT resources for the packet. Additionally, or alternatively, services processor 240 may send packet information associated with the packet. The packet information may include the tuple for the packet (e.g., 5-tuple for the packet=<1.1.1.1, 100, 2.2.2.2, 100, 6>).

As further shown in FIG. 3, process 300 may include receiving a call to allocate NAT resources (block 330). For example, NAT 260 may receive a call from services processor 240, via central processor 250, to allocate the NAT resources. Additionally, or alternatively, NAT 260 may receive the packet information, including the tuple, associated with the packet.

Additionally, or alternatively, NAT 260 may perform NAT and may allocate the NAT resources by determining a translated destination IP address, a translated destination port, and a translated source IP address (e.g., a translated destination IP address=3.3.3.3, a translated destination port=205, and a translated source IP address=4.4.4.4). A translated tuple (e.g., NAT performed on the tuple) may be expressed as <the translated source IP address, the translated source port, the translated destination IP address, the translated destination port, the translated IP protocol>, where the translated source port is not yet determined (e.g., translated 5-tuple=<4.4.4.4, src_xlate_port, 3.3.3.3, 205, 6>, where the translated source IP address=4.4.4.4, the undetermined translated source port=src_xlate_port, the translated destination IP address=3.3.3.3, the translated destination port=205, and the IP protocol=6).

Additionally, or alternatively, to find the same services processor 240 for a reverse packet after NAT is performed, NAT 260 may determine a translated source port for the translated tuple that provides the same remainder after the hash algorithm is applied to the translated tuple to determine a reverse hash value and after the MOD operation is performed on the reverse hash value, based on the quantity of services processors 240.

For example, NAT 260 may determine a remainder, where the remainder=(short_XOR(tuple)) % sp_num=(short_XOR(translated tuple)) % sp_num. NAT 260 may express the equation as the remainder=(short_XOR(translated tuple)) % sp_num=(short_XOR(translated source IP address, translated source port, translated destination IP address, translated destination port, IP protocol)) % sp_num (e.g., short_XOR(4.4.4.4, translated source port, 3.3.3.3, 205, 6) % 4=2). Additionally, or alternatively, NAT 260 may use a variable (e.g., 'D') to replace translated source IP address, translated destination IP address, translated destination port, and IP protocol in the translated tuple in order to begin solving for the translated source port.

As a result, NAT 260 may express the equation as the remainder=(short_XOR(translated source port, D) % sp_num) (e.g., short_XOR(translated source port, 203) % 4=2, where 2 is the remainder determined from performing the MOD operation on the original hash value), which may be expressed as the remainder=(short_XOR(translated source port) % sp_num) short_XOR(D % sp_num) (e.g., (short_XOR(translated source port) % 4) short_XOR(203% 4)=2 or (short_XOR(translated source port) % 4) XOR 3. Additionally, or alternatively, NAT 260 may isolate the translated source port by expressing the equation as short_XOR(translated source port) % sp_num=short_XOR(the remainder (short_XOR(D) % sp_num)) (e.g., short_XOR(translated source port) % 4=short_XOR(2 short_XOR 3)). Additionally, or alternatively, NAT 260 may solve for short_XOR(translated source port) % sp_num or a translated source port remainder since variables on the right side of the equation (i.e., the remainder, D, and sp_num) have known values (e.g., short_XOR (translated source port) % 4=1, where 1 is the translated source port remainder).

A translated source port remainder may range from equaling zero to the quantity of services processors 240 in network device 220 minus 1 (e.g., if sp_num=4, the translated source port remainder may equal 0, 1, 2 or 3; if sp_num=5, the translated source port remainder may equal 0, 1, 2, 3 or 4; etc.). Additionally, or alternatively, NAT 260 may use the translated source port remainder to determine the translated source port (e.g., the translated source port being selected so as to provide a same reverse hash value for the reverse packet as the original hash value for the packet), by using a NAT port manager.

The NAT port manager is a two-level port bitmap management system for selecting and/or assigning a logical port for the translated source port. The logical ports are arranged based on the translated source port remainder, allowing for an efficient selection of a logical port.

In computer systems, a binary digit (e.g., a bit) is the smallest unit of data. A bit has a single binary value (i.e., a 0 or a 1). The binary value may correspond to a set of computer instructions. A bitmap is a representation in which each item in the bitmap corresponds to one or more bits of information.

The first level in the two-level bitmap management system is a cache bitmap where each bit, associated with the cache bitmap (e.g., a cache bit), represents a status of port usage (i.e., a port is used or a port is not used) for a certain quantity of port bits (e.g., multiple port bits). Each port bit represents a logical port (e.g., 8 logical ports, 32 logical ports), associated with the cache bit. For example, where a cache bit represents the status of port usage for 32 logical ports, if all 32 logical ports are used, then an identifier associated with the cache bit is set to '1.' If all 32 logical ports are not being used (e.g., at least one logical port of the 32 logical ports is not being used), then the identifier associated with the cache bit is set to '0.'

To set up the cache bitmap, NAT 260 may obtain an overall logical port range (e.g., [1024, 65023], where 1024 is an identifier for a first port in the overall logical port range and 65023 is an identifier for a last port in the overall logical port range) from another component within network device 220 and/or another device. In some implementations, a user of network device 220 may configure the overall logical port range for network device 220 to provide to NAT 260.

Additionally, or alternatively, NAT 260 may determine a total quantity of logical ports associated with all services processors 240 in network device 220, where the total quantity of logical ports associated with all the services processors 240=(the identifier for the last port in the overall logical port range–the identifier for the first port in the overall logical port range+1) (e.g., the total quantity of logical ports associated with services processors 240= (65023–1024+1)=64000, where the logical port range is [1024, 65023]). In some implementations, a user of network device 220 may configure/provide the total quantity of logical ports associated with all services processors 240 for network device 220 to provide to NAT 260.

Additionally, or alternatively, NAT 260 may determine a total quantity of logical ports associated with each of services processor 240 in network device 220, where the total quantity of logical ports, for each services processor 240, equals the total quantity of logical ports, associated with all services processors 240 divided by the quantity of services processors 240 (e.g., the total quantity of logical ports associated with each services processor 240=64000/4=16000, where 64000 is the total quantity of logical ports associated with all services processors 240 in network device 220 and sp_num=4). In some implementations, a user of network device 220 may configure/provide the total quantity of logical ports associated with each services processor 240 for network device 220 to provide to NAT 260.

Additionally, or alternatively, NAT 260 may determine a quantity of cache bits, associated with each services processor 240, to set up the cache bitmap layer, where the quantity of cache bits, associated with each services processor 240, equals the total quantity of logical ports, associated with each services processor 240, divided by the certain quantity of port bits associated with each cache bit (e.g., the quantity of cache bits associated with each services processor 240=16000/32=500 cache bits, where 16000=the total quantity of logical ports associated with each services processor 240 and where 32 port bits are associated with each cache bit). In some implementations, a user of network device 220 may configure/provide the quantity of cache bits, associated with each services processor 240, to provide to NAT 260.

Additionally, or alternatively, NAT 260 may express the quantity of cache bits as a range (e.g., a cache_bit range from 0-499 bits, a cache_bit range from 500-999 bits, a cache_bit range from 1000-1499 bits, a cache_bit range from 1500-1999, etc.). A cache_bit range may be associated with a remainder in a translated source port remainder range (e.g., the cache_bit range from 0-499 bits may be associated with the translated source port remainder=0; a cache_bit range from 500-999 bits may be associated with the translated source port remainder=1; a cache_bit range from 1000-1499 bits may be associated with the translated source port remainder=2; a cache_bit range from 1500-1999 may be associated with the translated source port remainder=3, etc.).

The second level in the two-level port bitmap management system is a port bitmap, where the bit, associated with the port bitmap (e.g., a port bit), is associated with a cache_bit and represents a logical port. Each cache_bit may have a certain quantity of port bits associated with each cache_bit (e.g., 32 port bits associated with each cache_bit). NAT 260 may determine a port bit range for each cache_bit, where the port bit range equals [n*a, (n+1)*a−1], where 'n' is the cache_bit for which the associated port bit range is being determined and 'a' is the certain quantity of port bits associated with each cache_bit (e.g., cache_bit [0] includes port bit range [0, 31], where [0*32, (0+1)*32−1] and n=0 and a=32; cache bit [1] includes port bit range [32, 63], where [1*32, (1+1)*32−1] and n=1 and a=32; etc.).

Each port bit in the port bit range represents a logical port (e.g., port_bit=0 represents logical port number 0; port_bit=1 represents logical port number 4; port_bit=2 represents logical port number 8; etc.). NAT 260 may determine a logical port range where the logical port range equals [n/the quantity of cache bits in a cache bit range+(n % the quantity of cache bits in a cache bit range)*a*sp_num, n/the quantity of cache bits in a cache bit range+((n % the quantity of cache bits in a cache bit range+1)*a−1)*sp_num], where 'n' is the cache bit associated with the port bit range, including the logical port range being determined, and 'a' is the certain quantity of port bits associated with each cache bit (e.g., the logical port range=[0/500+(0%500)*32*4, 0/500+((0%500+1)*32−1)*4] or [0, 124], where n=0, a=32, the quantity of cache bits in a cache bit range=500, and the quantity of services processors 240=4).

The two-level bitmap management system may be established once within NAT 260, prior to processing any packets, by NAT 260 and/or another device.

As further shown in FIG. 3, process 300 may include selecting a translated source port (block 340). For example, NAT 260 may utilize the translated source port remainder (e.g., 0, 1, 2, 3, etc.) to determine a logical port to allocate as the translated source port. To determine the logical port, NAT 260 may use the cache bit range associated with the translated source port remainder (e.g., if the translated source port remainder=0, NAT 260 may use the cache_bit range from 0-499 bits, associated with translated source port remainder=0 to determine the logical port; if the translated source port remainder=1, NAT 260 may use the cache_bit range from 500-999 bits, associated with translated source port remainder=1 to determine the logical port; if the translated source port remainder=2, NAT 260 may use the cache_bit range from 1000-1499 bits, associated with translated source port remainder=2 to determine the logical port; if the translated source port remainder=3, NAT 260 may use the cache_bit range from 1500-1599 bits, associated with translated source port remainder=3 to determine the logical port; etc.).

Additionally, or alternatively, NAT 260 may search for a cache bit, within the cache bit range, with an unused port bit (e.g., for the translated source port remainder=1, associated with the cache_bit range 500-999, cache bit 501 is set to '0'). Additionally, or alternatively, NAT 260 may select the cache bit with an unused port bit for further processing. In some implementations, NAT 260 may start with the lowest cache bit, within the cache bit range, and incrementally consider each next cache bit in the cache bit range, until a cache bit with an unused port bit is determined (e.g., for the translated source port=1, associated with the cache_bit range 500-999, NAT 260 determines that cache bit 500 is set to '1' and may not be used, however NAT 260 determines that cache bit 501 is set to '0' and, therefore has unused port bits).

Additionally, or alternatively, NAT 260 may determine a port bit range for the selected cache bit (e.g., if the cache bit selected is 501, then the port bit range=equals [501*32, (501+1)*32−1]). Additionally, or alternatively, NAT 260 may determine an unused port bit, within the port bit range, having an unused logical port (e.g., the port bit [501*32+3] is set to '0', where [501*32] is the first bit in the port bit range and the '+3' indicates the fourth port bit in the port bit range). Additionally, or alternatively, NAT 260 may determine a logical port range associated with the port bit range (e.g., the logical port range=[501/500+(501% 500)*32*4, 501/500+((501%500+1)*32−1)*4] or [129, 253], where n=501, the quantity of cache bits in a cache bit range=500, and the quantity of services processors 240=4).

Additionally, or alternatively, NAT 260 may determine an identifier for the logical port, associated with the port bit and determined to have an unused logical port, where the identifier for the logical port=the identifier for the first logical port in the logical port range+w*(c−1), where 'w' is an incremental change in a value for the identifier for the logical ports (e.g., the identifier for each subsequent logical port, in the logical port range, is incremented by 4) and where 'c' is an order value for the logical port, associated with the port bit and determined to have an unused logical port (e.g., first port bit in the port bit range, second port bit in the port bit range, third bit in the port bit range, etc.).

For example, the identifier for the logical port, associated with the forth port bit in the port bit range and determined to have an unused logical port is (129+4 (4−1))=141, where '129' is the identifier for the first logical port in the logical port range [129, 253], 'w'=4, and 'c'=4 as the fourth bit in the port bit range. Additionally, or alternatively, if after allocating the logical port, if all the port bits associated with the cache bit are used, then NAT 260 may set an identifier, associated with the cache bit, equal to a value that indicates that all logical ports associated with the cache bit are used (e.g., an identifier associated with cache bit [501] is set to '1'). By allocating a logical port, NAT 260 allocates the associated port bit. If after allocating the logical port, if all the port bits associated with the cache bit are not used, then NAT 260 may keep the identifier, associated with the cache bit equal to a value that indicates that all the logical ports associated with the cache bit are not used (e.g., an identifier associated with cache bit [501] remains set '0').

As further shown in FIG. 3, process 300 may include providing the allocated NAT resources, including the translated source port (block 350). For example, NAT 260 may provide the allocated NAT resources, including the translated source port, to services processor 240 (e.g., provide the allocated NAT resources <4.4.4.4, 141, 3.3.3.3, 205, 6> to the same services processor 240 that sent the call to allocate NAT resources).

As further shown in FIG. 3, process 300 may include determining whether the original hash value equals a reverse hash value (block 360). For example, NAT 260 may provide the NAT allocated resources, including the translated source port to services processor 240 (e.g., provide a NAT allocated tuple=<4.4.4.4, 141, 3.3.3.3, 205, 6>). Additionally, or alternatively, services processor 240 may perform the hash algorithm (e.g., the short_XOR function) on the NAT allocated resources to obtain a reverse hash value, where the reverse hash value=(short_XOR(NAT allocated tuple)) (e.g., short_XOR(4.4.4.4, 141, 3.3.3.3, 205, 6)).

Additionally, or alternatively, services processor 240 may compare the original hash and the reverse hash value (e.g., compare short_XOR(1.1.1.1, 100, 2.2.2.2, 100, 6) to short_XOR(4.4.4.4, 141, 3.3.3.3, 205, 6)). If the original hash value and the reverse hash value are the same (e.g., the original hash value and the reverse hash value are equal, indicating that the translated source port was properly determined, where the NAT allocated reverse packet maps to the same services processor 240 as the packet for processing), then services processor 240 may process the packet. If the original hash value and the reverse hash value are not the same, then services processor 240 may process the packet by providing a message to a second services processor 240 to install a forwarding session for a reverse packet associated with the packet.

As further shown in FIG. 3, if the original hash value and the reverse hash value are the same (block 360—Yes), process 300 may include marking the packet for fast path processing (block 370). For example, services processor 240 may change a flag within the packet, marking the packet for fast path processing (e.g., flag='Fast,' flag=1, etc.), without a need to install a forwarding session. Additionally, or alternatively, services processor 240 may continue processing the packet and/or output the packet for further processing by another device.

As further shown in FIG. 3, if the original hash value and the reverse hash value are not the same (block 360—No), process 300 may include sending a message to install a forwarding session (block 380). For example, services processor 240 may provide a message to a second services processor 240 to install a forwarding session for a reverse packet associated with the packet (e.g., provide a message with instructions for installing a forwarding session for the reverse packet, which contains a translated source IP address, a translated source port, a destination IP address, a destination port, and an IP protocol). In this way, the reverse packet may still locate the same services processor 240 that processed the packet.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
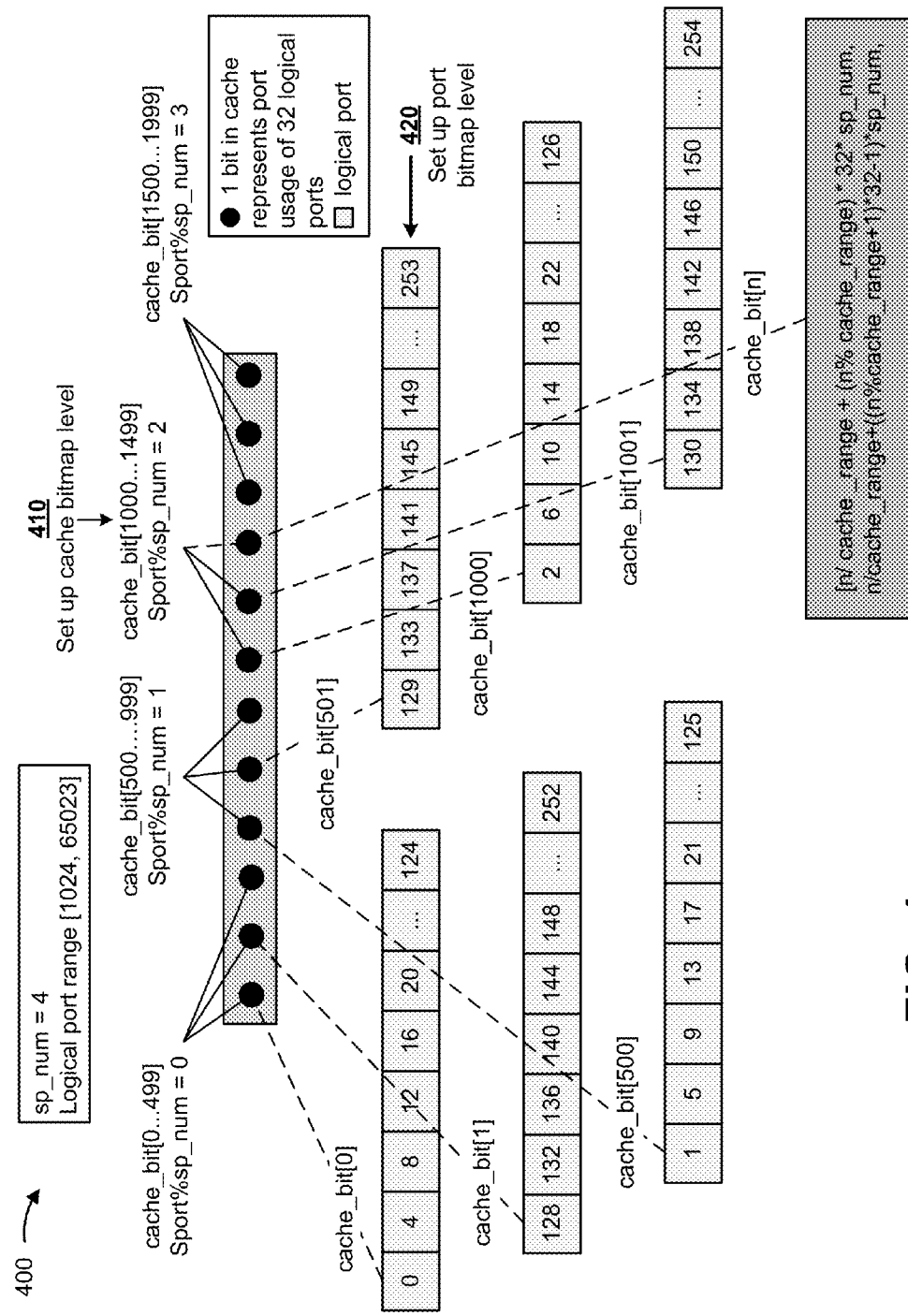
FIG. 4 is a diagram of an example implementation relating to the example process shown in FIG. 3.

FIG. 4 is a diagram of an example implementation 400 relating to example process 300 shown in FIG. 3. FIG. 4 shows an example of a NAT port manager using a two-level bitmap management system that enables port mapping using remainders, used for selecting translated source ports so that services processor 240 may process a packet without requiring a forwarding session installed for the packet.

As shown in FIG. 4, assume NAT 260 obtained an overall logical port range (e.g., [1024, 65023]) that may be used for allocating logical ports. Assume there are four services processors 240 in network device 220 (e.g., sp_num=4). Assume that each logical port, in the port range, is associated with a port bit. Assume that 32 logical ports and/or 32 port bits are associated with each cache bit.

As shown in FIG. 4, and by reference number 410, NAT 260 sets up the cache bitmap level (e.g., a first level) of the two-level bitmap management system by determining a quantity of cache bits and expressing the quantity of cache bits, associated with each translated source port remainder (e.g., translated source port (Sport) % sp_num), as a range (e.g., the quantity of cache bits associated with each services processor 240=500 cache bits, where the cache bit range [0-499 bits] is associated with Sport % 4=0, the cache bit range [500-999 bits] is associated with Sport % 4=1, the cache bit range [1000-1499 bits] is associated with Sport % 4=2, and the cache bit range [1500-1999 bits] is associated with Sport % 4=3).

As shown in FIG. 4, and by reference number 420, NAT 260 sets up the port bitmap level (e.g., a second level) of the two-level bitmap management system by determining logical port identifiers, for each port bit, associated with a cache bit in the first level.

As indicated above, FIG. 4 is provided merely as an example. Other examples are possible and may differ from what was described with regard to FIG. 4.

FIGS. 5A-5D are diagrams of an example implementation 500 relating to example process 300 shown in FIG. 3. FIGS. 5A-5D show an example of implementation relating to the example process shown in FIG. 3.

Figure 5A:
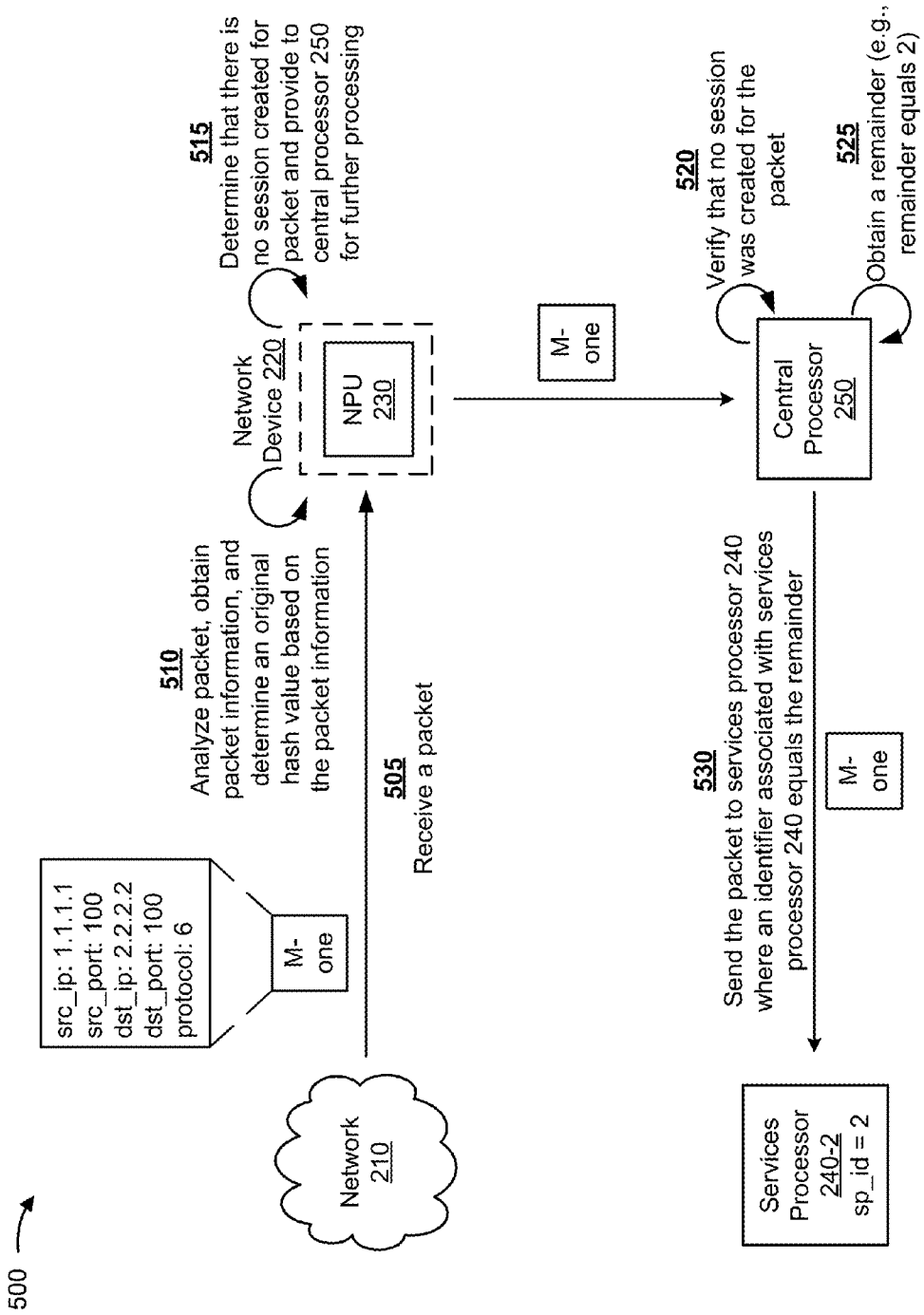

As shown in FIG. 5A, assume that a quantity of services processors 240 in network device 220 is equal to 4 (e.g., sp_num=4). As shown in FIG. 5A, and by reference number 505, network device 220 receives a packet (e.g., M-one) from network 210, via an interface of NPU 230. As shown in FIG. 5A, and by reference number 510, NPU 230 analyzes the packet, obtains packet information (e.g., 5-tuple=<1.1.1.1, 100, 2.2.2.2, 100, 6>), and determines an original hash value based on the packet information. As shown in FIG. 5A, and by reference number 515, NPU 230 determines that there is no session created for the packet (e.g., M-one is a first packet in a flow) and provides the packet to central processor 250 for further processing. As shown in FIG. 5A, and by reference number 520, central processor 250 verifies that no session was created for the packet.

As shown in FIG. 5A, and by reference number 525, central processor 250 obtains a remainder by performing a hash algorithm on the packet information and by performing a MOD operation on the result of the hash algorithm on the packet information, where the remainder is associated with services processor 240 (e.g., the remainder=2 associated with services processor 240 with sp_id=2, obtained by performing the hash algorithm on the packet information and by performing the MOD operation on the result of the hash algorithm). As shown in FIG. 5A, and by reference number 530, central processor 250 sends the packet to services processor 240-2, where an identifier associated with services processor 240 equals the remainder (e.g., sends to services processor 240-2 with sp_id=2).

Figure 5B:
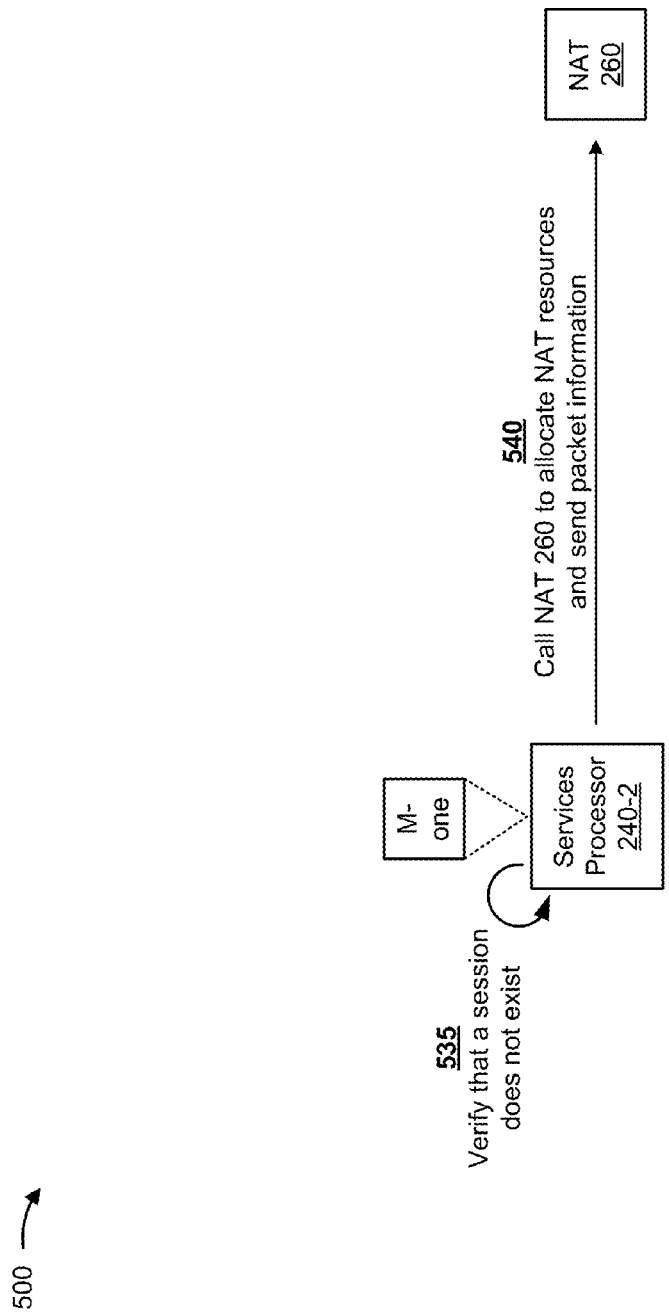

As shown in FIG. 5B, and by reference number 535, services processor 240-2 verifies that a session does not exist for the packet by comparing the tuple associated with the packet with stored tuples in a session table associated with services processor 240-2. As shown in FIG. 5B, and by reference number 540, services processor 240-2 calls NAT 260 to allocate NAT resources for the packet and sends the packet information to NAT 260 (e.g., 5-tuple for the packet=<1.1.1.1, 100, 2.2.2.2, 100, 6>).

Figure 5C:
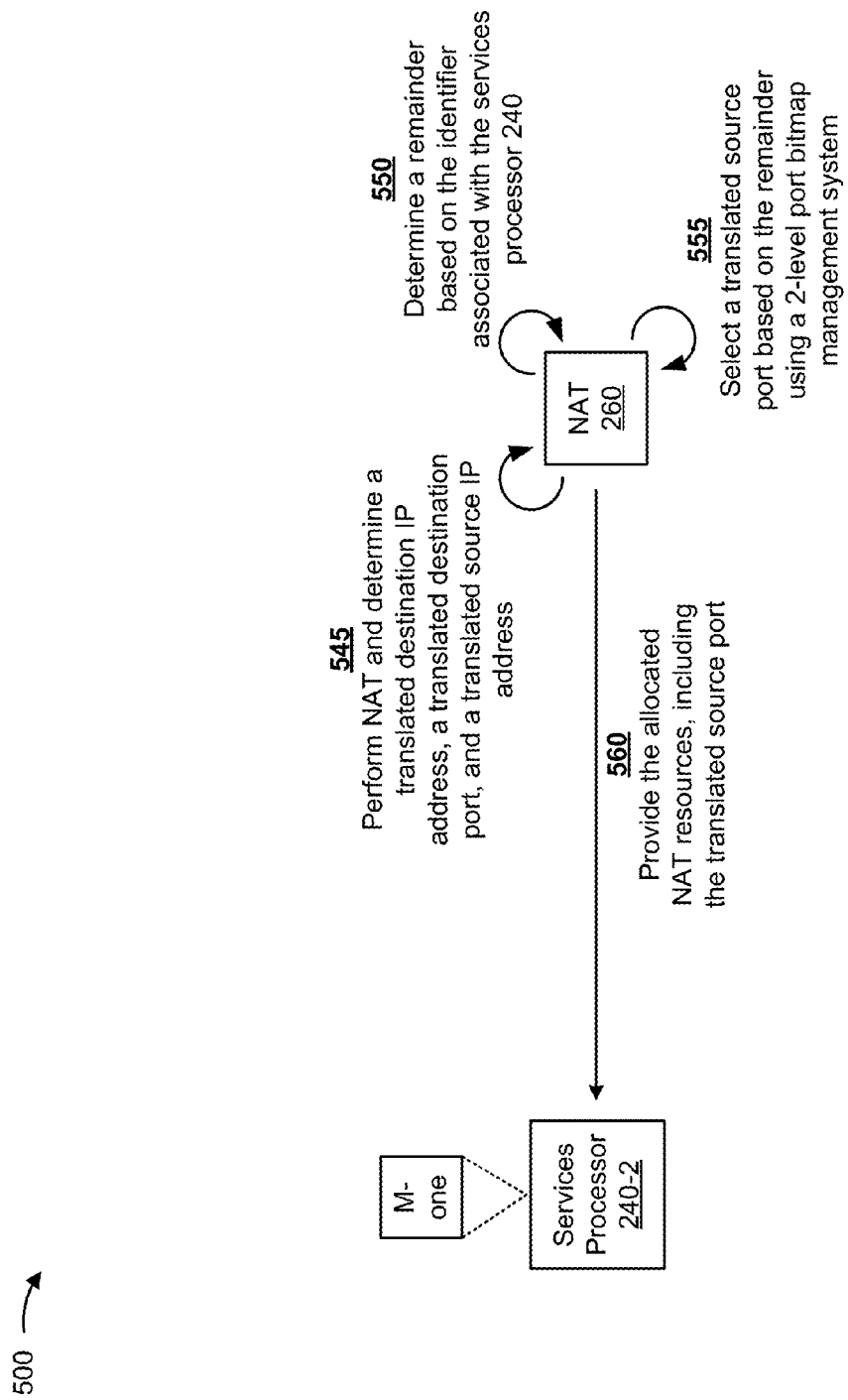

As shown in FIG. 5C, and by reference number 545, NAT 260 may perform NAT and determine a translated destination IP address, a translated destination port, and a translated source IP address (e.g., a translated destination IP address=3.3.3.3, a translated destination port=205, and a translated source IP address=4.4.4.4). As shown in FIG. 5C, and by reference number 550, NAT 260 may determine a remainder based on the identifier associated with services processor 240 (e.g., NAT 260 determines that the packet was received from services processor 240 with a sp_id=2, thereby determining that the remainder=2, since a value associated with the sp_id equals a value associated with the remainder).

As shown in FIG. 5C, and by reference number 555, NAT 260 may select a translated source port based on the remainder, by using a two-level port bitmap management system as described in FIGS. 3 and 4 above (e.g., select logical port 141 as the translated source port, where NAT 260 selects a first unused logical port within a port bit range, associated with a cache bit [501], where cache bit [501] is within a cache bit range associated with a translated source port remainder=1, determined based on the remainder=2).

As shown in FIG. 5C, and by reference number 560, NAT 260 provides the allocated NAT resources, including the translated source port to services processor 240-2 (e.g., provides the allocated NAT tuple <4.4.4.4, 141, 3.3.3.3, 205, 6> to services processor 240-2 with sp_id=2).

As shown in FIG. 5D, and by reference number 565, services processor 240 determines a reverse hash value, based on the allocated NAT resources, and determines that the original hash value and the reverse hash value are equal.

As shown in FIG. 5D, and by reference number 570, NAT 260 may process the packet, marking the packet for fast path processing (e.g., flag='Fast'). When a reverse packet associated with the packet enters network device 220, the reverse packet is sent directly to services processor 240-2 for further processing without requiring using a forwarding session to locate services processor 240-2.

sAs indicated above, FIGS. 5A-5D are provided merely as an example. Other examples are possible and may differ from what was described with regard to FIGS. 5A-5D.

By using a NAT port manager with a two-level port bitmap management system, a reverse packet may be sent to the same services processor, which processed the packet, based on the NAT port manager's allocation of NAT resources without requiring the packet to be forwarded to a second services processor for installing a forwarding session. As a result, the NAT port manager may conserve processor and memory resources and increase processing speed and efficiency.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be constructed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeable with "one or more." Where only one item is intended, the term "one" or similar language is used. Also, as used herein, the terms "has," "have," "having," or the like are intended to be open ended terms. Further, the phrase "based on" is intended to mean "based, at least in part, on" unless explicitly stated otherwise.

What is claimed is:

1. A network device, comprising:
  one or more processors to:
   receive a call from a services processor to allocate network address translation resources for a data packet;
   determine an identifier associated with the services processor;
   allocate a translated source address, a translated destination address, a translated destination port, and a protocol;
   perform a short XOR operation on a tuple,
    the tuple including the translated source address, the translated destination address, the translated destination port, and the protocol; and
   allocate network address translation resources using a network address port translation manager based on the identifier associated with the services processor and based on performing the short XOR operation on the tuple, the network address translation port manager being a two-level port bitmap management system that determines a translated source port for the data packet.

2. The network device of claim 1, where the two-level port bitmap management system includes a cache bitmap layer as a first level of the two-level port bitmap management system and includes a port bitmap layer as a second level of the two-level port bitmap management system.

3. The network device of claim 2, where a cache bit, included in the cache bitmap layer, is associated with a plurality of port bits.

4. The network device of claim 3, where each port bit of the plurality of port bits is associated with a logical port of the network device.

5. The network device of claim 1, where the one or more processors, when allocating the network address translation resources, are to:

determine a translated source port remainder based on the identifier associated with the services processor and based on performing the short XOR operation on the tuple; and determine the translated source port, based on the translated source port remainder, using the two-level port bitmap management system.

6. The network device of claim 5, where the one or more processors, when determining the translated source port remainder, are to:

perform a modulo operation, using the tuple as a dividend for the modulo operation and a total quantity of services processors, located within the network device, as a divisor for the modulo operation to obtain a result; and multiply the result by the identifier associated with the services processor to determine the translated source port remainder.

7. The network device of claim 5, where the one or more processors, when determining the translated source port, are to:

select a cache bit range associated with the translated source port remainder;

select a cache bit associated with the cache bit range;

determine a port bit range associated with the cache bit;

select an unused port bit included in the port bit range; and determine an identifier for an unused logical port, associated with the unused port bit, using the port bit range, the identifier for the unused logical port corresponding to the translated source port.

8. A computer-readable medium storing instructions, the instructions comprising:

one or more instructions that, when executed by one or more processors, cause the one or more processors to:

receive a call from a services processor to allocate network address translation resources for a data packet;

determine an identifier associated with the services processor;

allocate a translated source address, a translated destination address, a translated destination port, and a protocol;

perform a short XOR operation on a tuple, the tuple including the translated source address, the translated destination address, the translated destination port, and the protocol;

allocate network address translation resources, using a network address translation port manager, based on the identifier associated with the services processor and based on performing the short XOR operation on the tuple, the network address translation port manager being a two-level port bitmap management system; and provide the network address translation resources to the services processor.

9. The computer-readable medium of claim 8, where the one or more instructions, that cause the one or more processors to allocate the network address translation resources, cause the one or more processors to:

determine a translated source port remainder based on the identifier associated with the services processor and based on performing the short XOR operation on the tuple; and determine a translated source port based on the translated source port remainder using the two-level port bitmap management system.

10. The computer-readable medium of claim 9, where the one or more instructions, that cause the one or more processors to determine the translated source port, cause the one or more processors to:

select a cache bit range associated with the translated source port remainder;

select a cache bit associated with the cache bit range;

determine a port bit range associated with the cache bit;

select an unused port bit included in the port bit range; and determine an identifier for an unused logical port, associated with the unused port bit, using the port bit range, the identifier for the unused logical port corresponding to the translated source port.

11. The computer-readable medium of claim 10, where the one or more instructions, that cause the one or more processors to select the cache bit, cause the one or more processors to:

select the cache bit that is set to a value that indicates that the cache bit has one or more unused port bits.

12. The computer-readable medium of claim 10, where the one or more instructions, that cause the one or more processors to determine the port bit range associated with the cache bit, cause the one or more processors to:

determine the port bit range for the cache bit, where the port bit range equals $[n*a, (n+1)*a-1]$, 'n' being the cache bit for which the port bit range is being determined, 'a' being a quantity of port bits associated with the cache bit.

13. The computer-readable medium of claim 10, where the one or more instructions, that cause the one or more processors to select the unused port bit included in the port bit range, are to:

select the unused port bit that has a value set to indicate that the cache bit has one or more unused port bits.

14. A method, comprising:

receiving, by one or more processors, a call from a services processor to allocate network address translation resources for a data packet;

determining, by the one or more processors, an identifier associated with the services processor;

allocating, by the one or more processors, a translated source address, a translated destination address, a translated destination port, and a protocol;

performing, by the one or more processors, a short XOR operation on a tuple,
    the tuple including the translated source address, the translated destination address, the translated destination port, and the protocol;
allocating, by the one or more processors, the network address translation resources, using a two-layer port bitmap management system, based on the identifier associated with the services processor and based on performing the short XOR operation on the tuple,
    the network address translation resources being associated with a hash value; and
providing, by the one or more processors, the network address translation resources to the services processor.

15. The method of claim 14, further comprising:
determining a translated source port remainder based on the identifier associated with the services processor and based on performing the short XOR operation on the tuple; and
determining a translated source port based on the translated source port remainder.

16. The method of claim 15, further comprising:
selecting a cache bit range associated with the translated source port remainder;
selecting a cache bit associated with the cache bit range;
determining a port bit range associated with the cache bit;
selecting an unused port bit included in the port bit range; and
determining an identifier for an unused logical port, associated with the unused port bit, using the port bit range,
    the identifier for the unused logical port corresponding to the translated source port.

17. The method of claim 16, further comprising:
setting an identifier associated with the cache bit equal to a value that indicates that all logical ports associated with the cache bit are used.

18. The method of claim 16, where determining the identifier for the unused logical port, comprises:
determining a logical port range; and
determining the identifier for the unused logical port based on the logical port range.

19. The method of claim 18, where determining the logical port range, comprises:
determining the logical port range, where [n/a quantity of cache bits in the cache bit range+(n % the quantity of cache bits in the cache bit range)*a*a total quantity of services processors located within a network device] equals a first logical port associated with the logical port range and [n/the quantity of cache bits in the cache bit range+((n % the quantity of cache bits in the cache bit range+1)*a−1)*the total quantity of services processors located within the network device] equals a last logical port associated with the logical port range,
    'n' being the cache bit associated with the port bit range, and
    'a' being a quantity of port bits associated with each cache bit.

20. The method of claim 19, where determining the logical port range, comprises:
determine the identifier for the unused logical port, where the identifier for the unused logical port equals the first logical port in the logical port range+w*(c−1),
    'w' being an incremental change in a value for identifiers for logical ports in the logical port range,
    'c' being an order value for the unused port bit within the logical port range.

* * * * *